United States Patent [19]
Fitzgerald, V et al.

[11] Patent Number: 5,787,485
[45] Date of Patent: Jul. 28, 1998

[54] PRODUCING A MIRRORED COPY USING REFERENCE LABELS

[75] Inventors: Martin J. Fitzgerald, V, Medway; Glenn A. Tremblay, Upton, both of Mass.

[73] Assignee: Marathon Technologies Corporation, Boxboro, Mass.

[21] Appl. No.: 714,255

[22] Filed: Sep. 17, 1996

[51] Int. Cl.[6] .................................................. G06F 12/16
[52] U.S. Cl. ...................... 711/162; 711/112; 395/182.04
[58] Field of Search .................................. 711/162, 114, 711/112; 395/182.04

[56] References Cited

U.S. PATENT DOCUMENTS

| | | | |
|---|---|---|---|
| 5,099,485 | 3/1992 | Bruckert et al. | 371/68.3 |
| 5,295,258 | 3/1994 | Jewett et al. | 395/575 |
| 5,390,313 | 2/1995 | Yanai et al. | 711/112 |
| 5,487,160 | 1/1996 | Bemis | 711/114 |
| 5,544,347 | 8/1996 | Yanai et al. | 711/162 |
| 5,588,110 | 12/1996 | DeKoning et al. | 395/182.03 |
| 5,623,595 | 4/1997 | Bailey | 395/182.04 |
| 5,633,999 | 5/1997 | Clowes | 395/182.04 |

OTHER PUBLICATIONS

Davis, "Design of VMS Volume Shadowing Phase II—Host–Based Shadowing," Digital Technical Journal, vol. 3, No. 3, Summer 1991, pp. 7–15.

*Primary Examiner*—Tod R. Swann
*Assistant Examiner*—David Langjahr
*Attorney, Agent, or Firm*—Fish & Richardson P.C.

[57] ABSTRACT

A mirror set copy from a first storage device to a second storage device is performed in a computer system in which write requests are each associated with a reference label. Write requests and a mirror read request are received at the first storage device, and the write requests also are received at the second storage device. The write requests are processed at the first storage device processes. Data is read from the first storage device in response to the mirror read request. The first storage device then sends the data to the second storage device along with a reference label of a write request received at the first storage device prior to sending the data. Thereafter, the second storage device writes the data. Finally, the second storage device processes write requests until the second storage device encounters a write request having the same reference label as that sent with the data.

24 Claims, 4 Drawing Sheets

PRODUCING A MIRRORED COPY USING REFERENCE LABELS

BACKGROUND OF THE INVENTION

The invention is directed to techniques for producing a mirrored copy of a disk drive or other storage device.

In many computer systems, a level of fault tolerance is provided by storing identical data on each of multiple storage devices. Storage devices having identical data are referred to as mirrored devices and are said to belong to a mirror set. If one mirrored device in a mirror set fails or otherwise becomes inaccessible, the other mirrored device or devices in the mirror set continue to provide access to the data.

To maintain identical data on each device in a mirror set, each device must receive and process every request to store data on the mirror set (i.e., every write request). A device in a mirror set will diverge from other devices in the mirror set if the device is unable to process such write requests. When members of a mirror set become divergent, a mirror set copy must be performed to copy data from one mirrored device to another mirrored device. In one approach to performing a mirror set copy, the computer system is shut down and all data are copied from one mirrored device to the other mirrored device.

SUMMARY OF THE INVENTION

In one aspect, generally, the invention features performing a mirror set copy from a first storage device to a second storage device in a computer system in which write requests are each associated with a reference label. Write requests and a mirror read request are received at the first storage device, and the write requests also are received at the second storage device. The write requests are processed at the first storage device, and data is read from the first storage device in response to the mirror read request. The first storage device then sends the data to the second storage device along with information designating write requests that the second storage device is permitted to process. Thereafter, the second storage device writes the data and processes any write requests designated by the information provided by the first storage device as being permissible for the second storage device to process.

Embodiments of the invention may include one or more of the following features. The information sent with the data to the second storage device may be a reference label of a write request received at the first storage device prior to sending the data to the second storage device. Thereafter, the second storage device may process write requests until the second storage device encounters a write request having the same reference label as that sent with the data.

The reference label sent with the data to the second storage device may be associated with a write request that has been received and processed at the first storage device prior to sending the data. In particular, the reference label may be associated with a write request that has been received and processed at the first storage device prior to reading data from the first storage device in response to the mirror read request. This approach permits the first storage device to perform write requests or other mirror read requests immediately after reading data in response to the mirror read request.

Alternatively, the reference label sent with the data may be associated with a write request that has been received but not yet processed at the first storage device prior to sending the data. With this approach, the first storage device must be configured so that first storage device does not perform any other mirror read requests until the first storage device processes the write request associated with the reference label sent with the data. If the first storage device were to perform an additional mirror read request before performing the write request associated with the reference label sent with the data, there is some risk that the second storage device could overwrite data from the write request with stale data from the additional mirror read request.

The mirror read request may be transmitted from the second storage device or from a central processor. The mirror read request also may be generated at the first storage device. A series of mirror read requests may together request the entire contents of the first storage device.

Each storage device must process write requests in the same order. Write requests may be processed in an order in which the write requests are received, and also may be processed in an order corresponding to the associated reference labels. The write requests need not be received in an order corresponding to the associated reference labels. The reference labels may be, for example, sequential or non-sequential numbers or text.

In another aspect, generally, the invention features a mirrored data storage system. The system includes a first storage device, a second storage device, a first controller associated with the first storage device, and a second controller associated with the second storage device. The first controller is configured to receive write requests and a mirror read request, to process write requests by writing data to the first storage device, to read data from the first storage device in response to the mirror read request, and to send the data to the second controller along with information designating write requests that the second controller is permitted to process. The second controller is configured to receive write requests, to receive the data from the first controller, to write the data to the second storage device, and to process any write requests designated by the information provided by the first storage device as being permissible for the second controller to process.

The information sent with the data to the second storage device may be a reference label associated with a write request received by the first controller prior to sending the data. The second controller may be configured to process write requests by writing data to the second storage device until a write request associated with the same reference label as that sent with the data by the first controller is encountered.

Other features and advantages of the invention will be apparent from the following detailed description, including the drawings, and from the claims.

DESCRIPTION OF THE PREFERRED EMBODIMENTS

Figure 1:
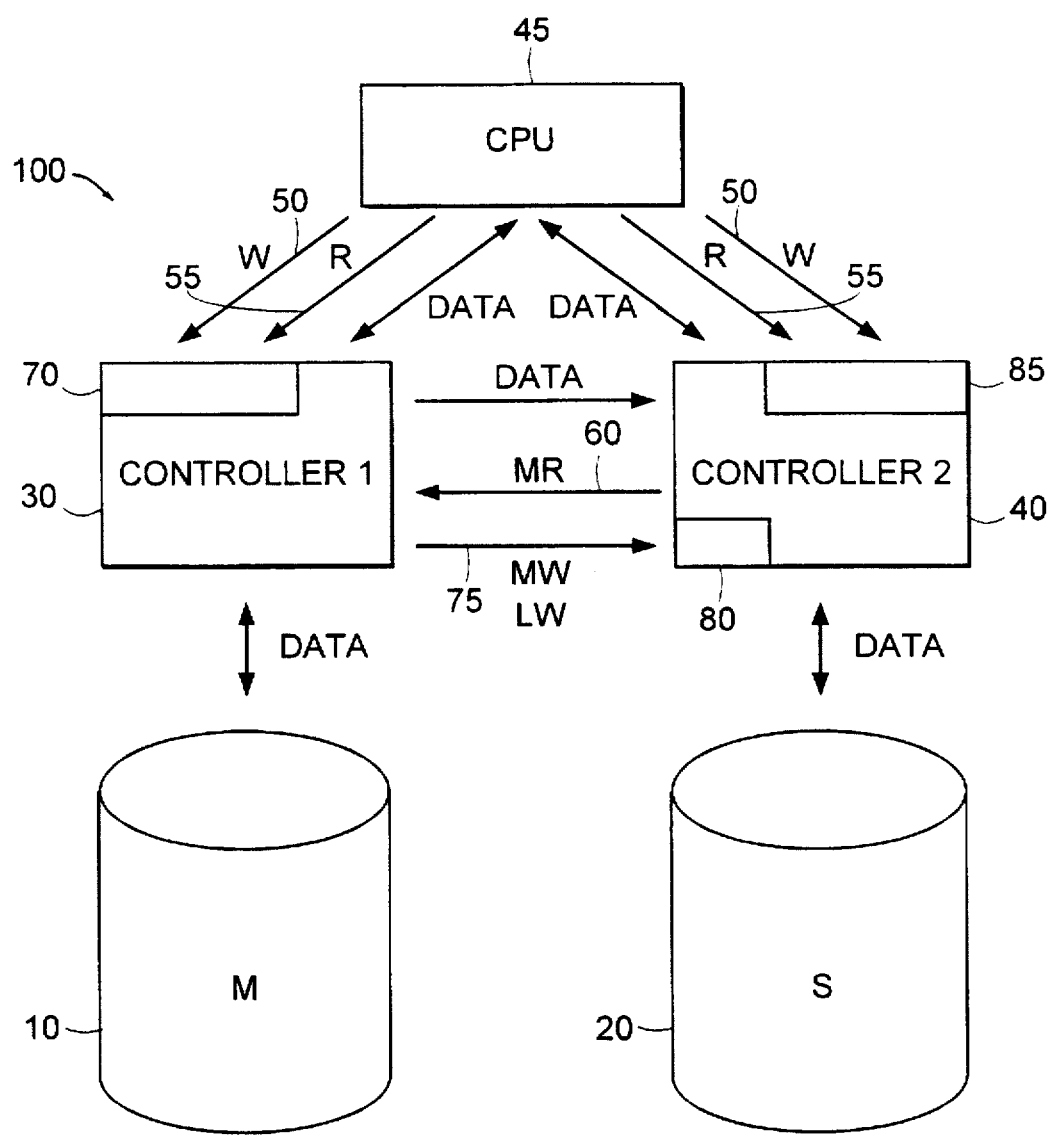
FIG. 1 is a block diagram of a mirrored drive system.

FIG. 1 shows a block diagram of a mirror set 100 that includes two disk drives: a first disk 10 and a second disk 20. One of the disks is designated as the master disk and serves as the primary data storage device, while the other disk is designated as the slave disk and serves as a redundant backup. When both disks are active and contain the same data, master/slave status may be assigned arbitrarily to the two disks. In FIG. 1, the disk 10 has been designated as the master disk while the disk 20 has been designated as the slave disk.

A first controller 30 is associated with the first disk 10 and a second controller 40 is associated with the second disk 20. The controllers 30, 40 control the reading and writing of data on the disks.

A processor 45 sends write requests 50 to both controllers simultaneously. Each write request contains data. In addition, a reference label, such as a sequential reference number, is associated with each write request. The controllers write the data from the write requests to their respective disks so that, under normal conditions, both disks contain identical data. Each controller must process the write requests in the same order. If the controllers process the write requests in order of the reference labels, the controllers need not receive the write requests in the same order.

The processor 45 also sends read requests 55 to the controllers. When both disks contain the same data, only the master disk responds to the read requests 55. When the master disk fails or becomes inaccessible, the slave disk is redesignated as the master disk and continues to provide data to the processor 45. Thus, if the disk 10 failed, then the disk 20 would become the master disk.

A disk in a mirror set 100 will contain divergent data from that of its peer if the disk is unable to process write requests for some period of time. For example, if the slave disk were disabled for a period of time, the data of the slave disk would differ from the data of the master disk. When the disks in a mirror set become divergent, a mirror set copy must be implemented to copy data from the disk having "good" data to the disk having divergent data.

The following discussion assumes that the slave disk 20 has previously failed and recovered, so that the slave disk 20 contains data that diverges from the "good" data on the master disk 10. The mirror set 100 performs a mirror set copy of the data from the master disk 10 to the slave disk 20 while the master disk 10 continues to process write requests 50 and read requests 55.

The slave controller 40 initiates a mirror set copy by transmitting a mirror read request 60 to the master controller 30. The master controller 30, in the illustrated embodiment, places the mirror read request 60 in a queue 70 that also may contain write requests 50 and read requests 55. The master controller 30 then processes entries in the queue 70 in the order in which the entries were placed in the queue.

Upon reaching the mirror read request 60 in the queue 70, the master controller 30 reads the data identified in the request and transmits the data to the slave controller 40 as a mirror write request 75. The master controller 30 includes with the mirror write request 75 the reference number (LW) associated with the last write request 50 that the master controller 30 processed before processing the mirror read request 60.

Upon receiving the mirror write request 75, the slave controller 40 places the mirror write request 75 in a queue 80 that differs from a queue 85 that may contain write requests 50 and read requests 55. The slave controller 40 then writes the data from the mirror write request 75 to the disk 20.

Because the master controller 30 processes write requests 50 while performing the mirror set copy, data included in the mirror write request 75 may be changed by a subsequent write request 50. This could result in the recording of "stale" data on the slave disk 20. To avoid this potential problem, the slave controller 40 also processes write requests 50 while performing the mirror set copy, and does so in a way which ensures that data from a write request 50 will not be overwritten by "stale" data from a mirror write request 75.

Figure 2:
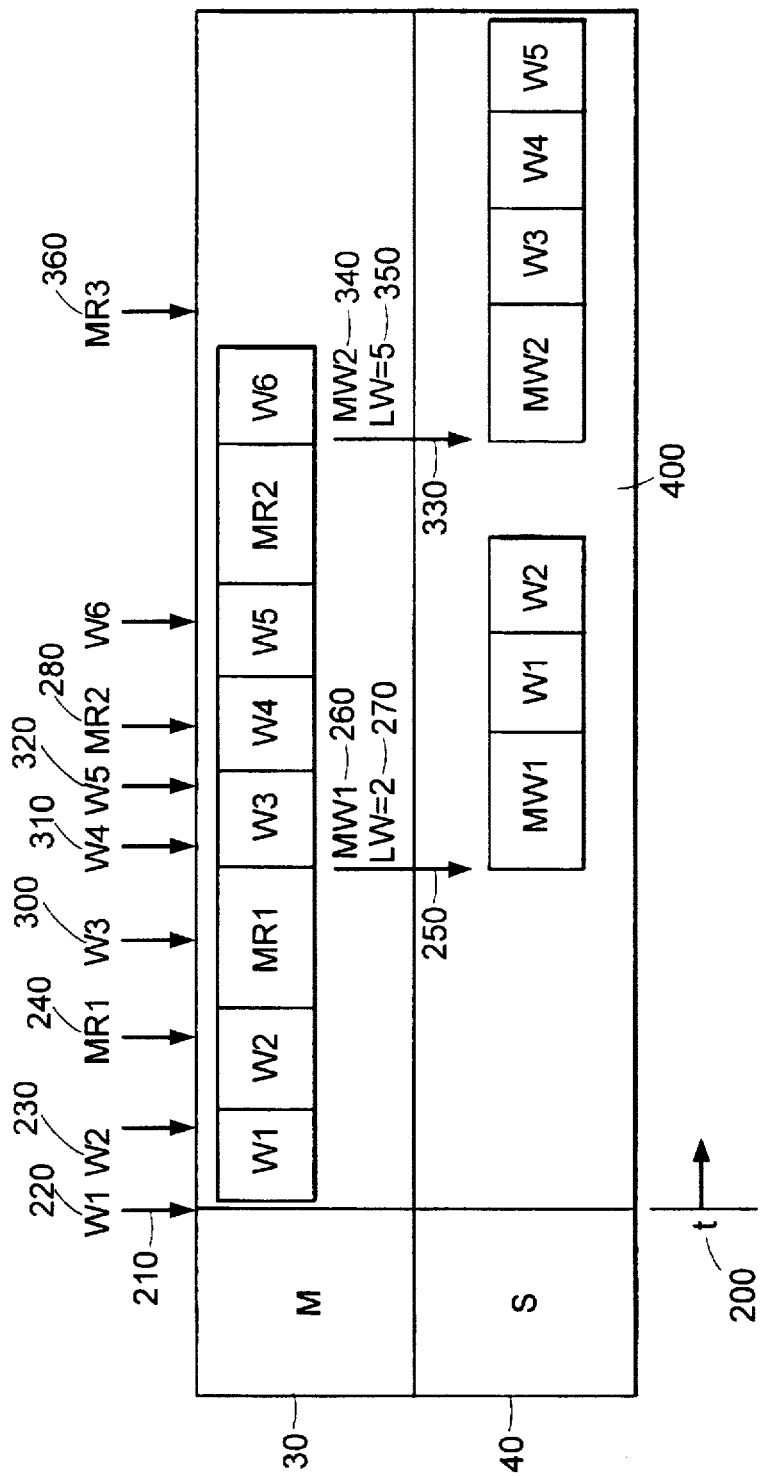
FIGS. 2 and 3 are timing diagrams.

FIG. 2 provides a timing diagram for operation of the master controller 30 and the slave controller 40 during a mirror set copy. The arrows at the top of the diagram indicate the times at which write requests 50 are received at the controllers, and the times at which mirror read requests are received at the master controller 30. The boxes indicate the periods during which write requests, mirror read requests and mirror write requests are processed by the controllers. For ease of illustration and discussion, the reference labels associated with the write requests are portrayed as consecutive numbers that are received in order. In actual applications, the reference labels need not be consecutive or sequential. Nor do the reference labels need to be numbers.

As shown in FIG. 2, the controllers receive write requests 220 (W1) and 230 (W2) before the slave controller 40 generates a mirror read request 240 (MR1). Accordingly, the master controller 30, in the illustrated embodiment, processes the write requests (W1) and W2 before processing the mirror read request MR1.

As represented by the arrow 250, the master controller 30 passes a mirror write request 260 (MW1) to the slave controller 40 after performing the mirror read request MR1. The mirror write request MW1 includes the mirror read data and the reference number 270 (LW) of the last write request that the master controller 30 processed before processing the mirror read request MR1. Since W2 was the last write request processed, the mirror write request indicates that LW equals two.

Upon receiving the mirror write request MW1, the slave controller 40 processes it. The slave controller 40 then generates a second mirror read request 280 (MR2). Next, the slave controller 40 processes write requests W1 and W2. Since the write request W2 corresponds to the number LW provided in the mirror write request, the slave controller 40 stops processing and waits for the results of the mirror read request MR2.

Continuing the mirror set copy, the master controller 30 processes write requests 300 (W3), 310 (W4), and 320 (W5). The master controller 30 then performs mirror read MR2. As represented by the arrow 330, the master controller 30 then passes a mirror write request 340 (MW2) to the slave controller 40. The mirror write request MW2 includes the mirror read data and the reference number 350 of the last write request that the master controller 30 processed before processing the mirror read request MR2. Since W5 was the last write request processed, the mirror write request indicates that the reference number of the last write request 350 (LW) equals five.

Upon receiving the mirror write request MW2, the slave controller 40 processes it. The slave controller 40 then generates a mirror read request 360 (MR3). Next, the slave controller 40 processes write requests W3, W4 and W5. Since the write request W5 corresponds to the reference number LW provided in the mirror write request, the slave controller 40 stops processing and waits for the results of the mirror read request MR3. This process continues until the slave controller 40 has processed mirror write requests corresponding to the entire contents of the master disk 10 (i.e., until the disks no longer contain divergent data).

Figure 3:
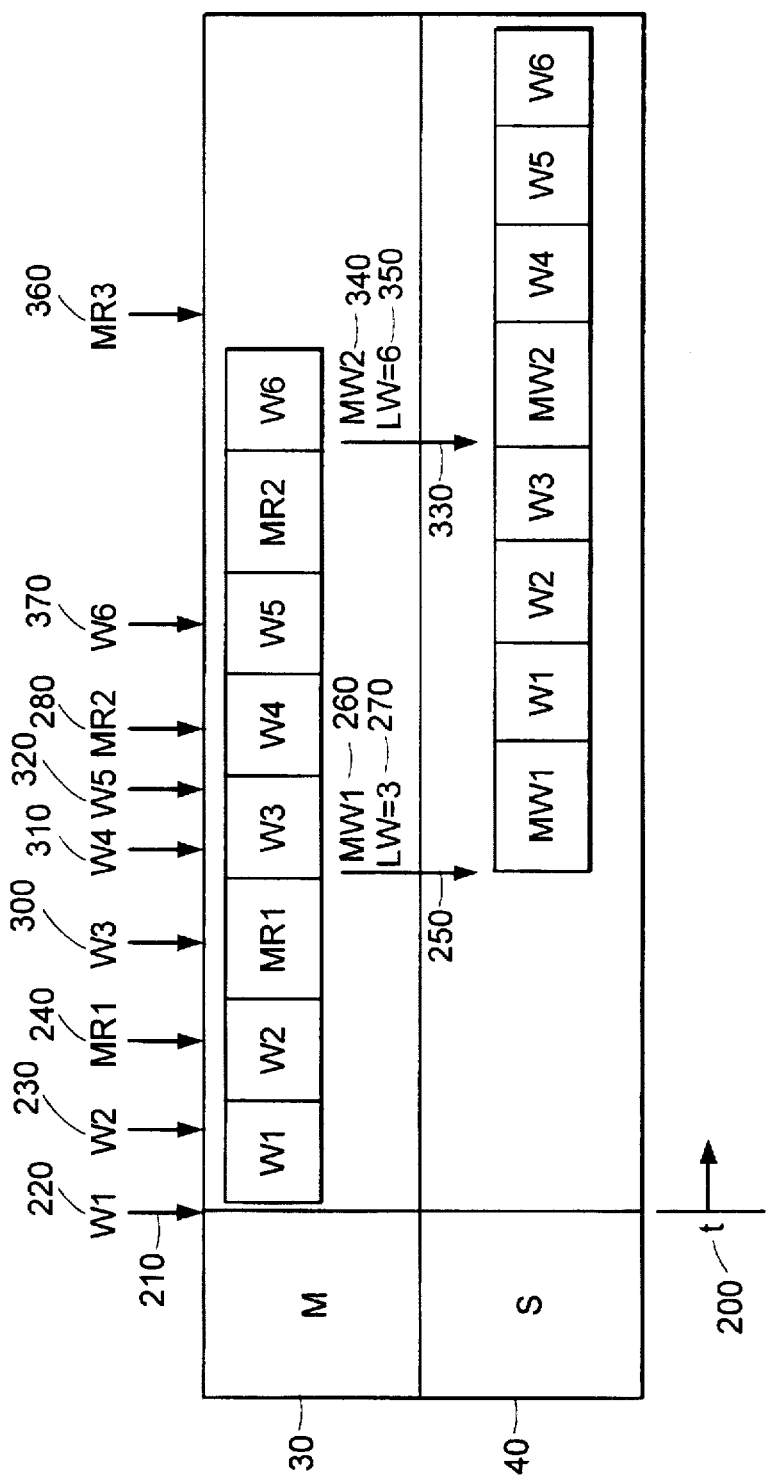

FIG. 3 shows a timing diagram for another embodiment of the invention. This embodiment functions as described above, with the exception that the master controller includes in the mirror write request the reference number of the last write request received (but not necessarily processed) at the time that the master controller is generating the mirror write request, rather than the last write request received and processed at the time the master controller began processing the mirror read request.

As shown in FIG. 3, the controllers receive write requests W1 and W2 before the slave controller 40 generates a mirror read request MR1. Accordingly, the master controller 30 processes the write requests W1 and W2 before processing the mirror read request MR1.

As represented by the arrow 250, the master controller 30 passes a mirror write request MW1 to the slave controller 40 after performing the mirror read request MR1. The mirror write request MW1 includes the mirror read data and the reference number LW of the last write request that the master controller 30 received before generating the mirror write request MW1. Since W3 was the last write request received, the mirror write request indicates that LW equals three.

Upon receiving the mirror write request MW1, the slave controller 40 processes it. The slave controller 40 then generates a second mirror read request MR2. Next, the slave controller 40 processes write requests W1, W2, and W3. Since the write request W3 corresponds to the number LW provided in the mirror write request, the slave controller 40 stops processing and waits for the results of the mirror read request MR2.

Continuing the mirror set copy, the master controller 30 processes write requests W3, W4, and W5. The master controller 30 then performs mirror read MR2. As represented by the arrow 330, the master controller 30 then passes a mirror write request MW2 to the slave controller 40. The mirror write request MW2 includes the mirror read data and the reference number LW of the last write request that the master controller 30 received before generating the mirror write request MW2. Since write request 370 (W6) was the last write request received, the mirror write request indicates that the reference number of the last write request LW equals six.

Upon receiving the mirror write request MW2, the slave controller 40 processes it. The slave controller 40 then generates a mirror read request MR3. Next, the slave controller 40 processes write requests W4, W5 and W6. Since the write request W6 corresponds to the reference number LW provided in the mirror write request, the slave controller 40 stops processing and waits for the results of the mirror read request MR3. This process continues until the slave controller 40 has processed mirror write requests corresponding to the entire contents of the master disk 10 (i.e., until the disks no longer contain divergent data).

The embodiment illustrated in FIG. 3 can be more efficient than the embodiment illustrated in FIG. 2. In particular, the embodiment of FIG. 3 is less likely to result in periods in which the slave disk 20 is inactive. One such period is illustrated by the gap 400 in FIG. 2. However, the embodiment illustrated in FIG. 3 requires that the master controller refrain from processing additional mirror read requests until the master controller has processed the write request identified in a previous mirror write request. By contrast, the embodiment illustrated in FIG. 2 permits the master controller to take any action, including processing an additional mirror read request, immediately after generating a mirror write request.

Figure 4:
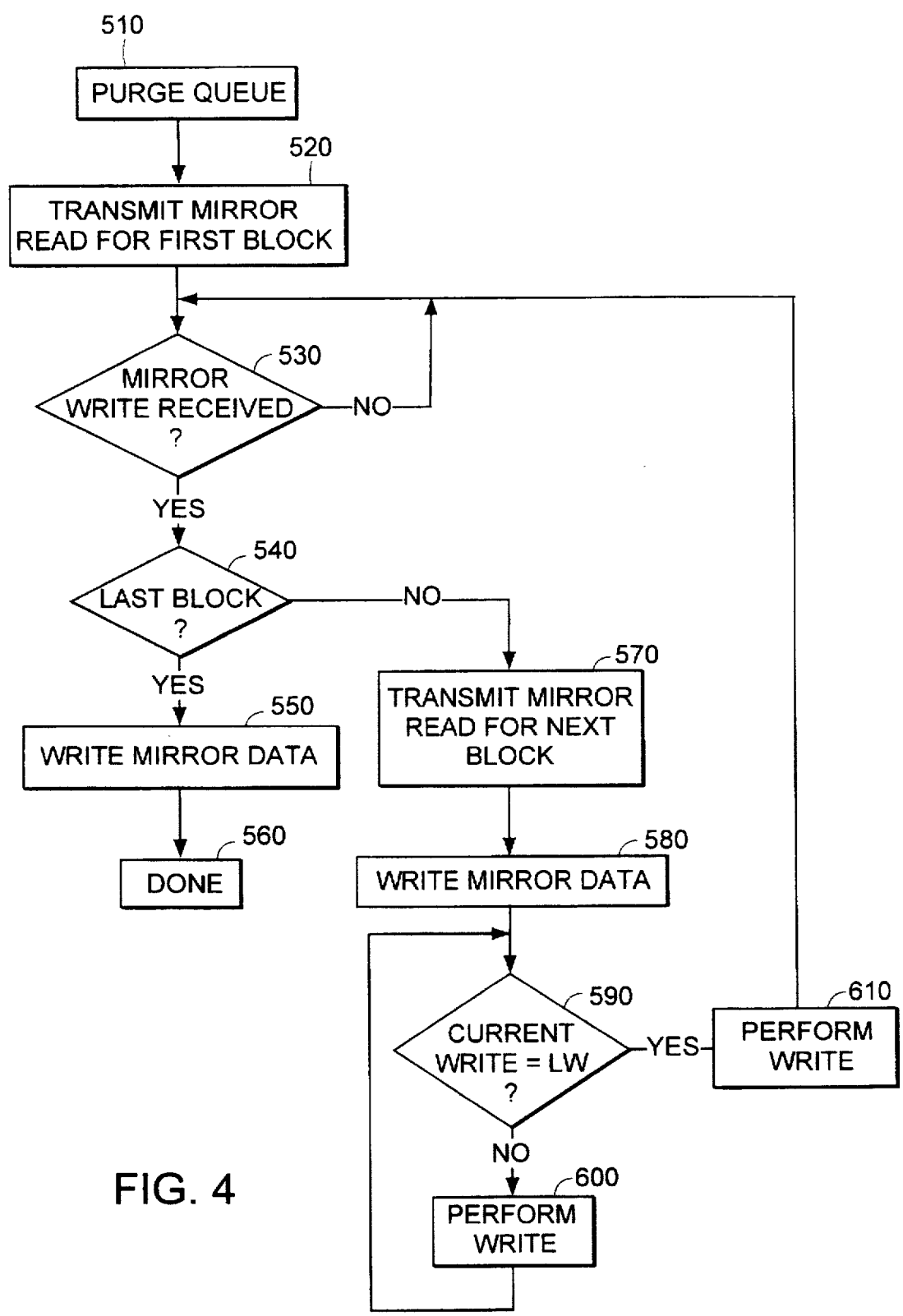
FIG. 4 is a flow chart of a procedure for implementing a mirror set copy.

Referring to FIG. 4, the slave controller 40 can perform the mirror set copy according to a procedure 500. To begin a mirror set copy, the slave controller 40 first purges its read/write request queue 85 (step 510). The controller can do this because any write requests in the queue (i.e., any write requests received prior to initiation of the mirror set copy) will have been processed by the master controller 30 and will be reflected in data included in mirror write requests. Next, the slave controller 40 sends a mirror read request 60 to the master controller 30 (step 520). Thereafter, the slave controller 40 waits for receipt of a mirror write request 75 (step 530).

Once the slave controller receives a mirror write request, the slave controller determines whether the data is the last block of data to be copied from the master disk 10 (step 540). If so, the slave controller writes the mirror write data to the slave disk 20 (step 550) and the mirror set copy is complete (step 560).

If the data received from the master 10 is not the last block of data to be copied from the master disk 10 (step 540), the slave controller 40 sends another mirror read request 60 (step 570) and writes the data it has just received to the slave disk 20 (step 580).

Next, the slave controller 40 determines whether the reference label of the next write request 50 in the queue 85 corresponds to the write request (LW) identified by the master controller in the mirror write request (step 590). If not, then the slave controller 40 processes another write request 50 from the queue 85 (step 600) and checks the next write request 50 in the queue 85 (step 590). The slave controller 40 continues processing write requests 50 from the queue 85 until the reference label of a write request 50 corresponds to the reference label (LW) identified by the master controller in the mirror write request. At that point, the slave controller processes the write request 50 (step 610) and waits for the next mirror write request (step 530).

Other embodiments are within the scope of the following claims. Instead of receiving mirror read requests from the slave controller, the master controller may generate the mirror read requests. In addition, instead of sending a reference label with data in response to a mirror read request, the master controller may send other information. For example, if the reference labels correspond to times at which the write requests are generated, the master controller may send information corresponding to the time that the mirror write request is generated or the time that processing of the mirror read request completes.

What is claimed is:

1. A method of performing a mirror set copy from a first storage device to a second storage device in a computer system in which each write request is identified by a reference label, the method comprising:

receiving write requests at the first storage device, receiving the write requests at the second storage device, processing write requests at the first storage device, reading mirror data from the first storage device in response to a mirror read request, sending the mirror data to the second storage device along with information designating at least one write request that the second storage device is permitted to process, writing the mirror data to the second storage device, and after writing the mirror data, processing at the second storage device any write requests designated by the information provided with the mirror data.

2. The method of claim 1, wherein the information sent with the mirror data is a reference label identifying a write request received at the first storage device prior to sending the mirror data to the second storage device.

3. The method of claim 2, wherein the step of processing at the second storage device any write requests designated by the information provided with the mirror data comprises processing write requests until a write request identified by the reference label sent with the mirror data is encountered.

4. The method of claim 2, wherein the step of processing at the second storage device any write requests designated by the information provided with the mirror data comprises processing write requests until a write request identified by the reference label sent with the mirror data is encountered and processed.

5. The method of claim 2, wherein the reference label sent with the mirror data identifies a write request that has been received and processed at the first storage device prior to sending the mirror data.

6. The method of claim 5, wherein the reference label sent with the mirror data identifies a write request that has been received and processed at the first storage device prior to the step of reading mirror data from the first storage device in response to the mirror read request.

7. The method of claim 2, wherein the reference label sent with the mirror data identifies a write request that has been received but not yet processed at the first storage device prior to sending the mirror data.

8. The method of claim 1, further comprising the step of generating the mirror read request at the first storage device.

9. The method of claim 1, further comprising the step of transmitting the mirror read request from the second storage device.

10. The method of claim 1, wherein the step of processing write requests at the first storage device comprises processing the write requests in an order in which the write requests are received and the step of processing write requests at the second storage device comprises processing the write requests in an order in which the write requests are received.

11. The method of claim 1, wherein the step of processing write requests at the first storage device comprises processing the write requests in an order corresponding to the associated reference labels and the step of processing write requests at the second storage device comprises processing the write requests in an order corresponding to the associated reference labels.

12. The method of claim 11, wherein the reference labels comprise numbers, the step of processing write requests at the first storage device comprises processing the write requests in order of numerical values of the associated reference labels, and the step of processing write requests at the second storage device comprises processing the write requests in order of numerical values of the associated reference labels.

13. A mirrored data storage system, comprising:
a first storage device;
a second storage device;
a first controller associated with the first storage device; and
a second controller associated with the second storage device;
wherein:
the first controller is configured to:
receive write requests,
process write requests by writing data to the first storage device,
read mirror data from the first storage device in response to a mirror read request, and
send the mirror data to the second controller along with information designating at least one write request that the second controller is permitted to process; and
the second controller is configured to:
receive the write requests,
receive the mirror data from the first controller,
write the mirror data to the second storage device, and
process, after writing the mirror data, any write requests designated by the information provided with the mirror data.

14. The system of claim 13, wherein the first controller is configured so that the information sent with the mirror data is associated with a reference label of a write request received at the first storage device prior to sending the mirror data to the second storage device.

15. The system of claim 14, wherein the second controller is configured to process write requests until a write request associated with the reference label sent with the mirror data is encountered.

16. The system of claim 14, wherein the first controller is configured so that the reference label sent with the mirror data is associated with a write request that has been received and processed by the first controller prior to sending the mirror data.

17. The system of claim 16, wherein the first controller is configured so that the reference label sent with the mirror data is associated with a write request that has been received and processed by the first controller before the first controller reads mirror data from the first storage device in response to the mirror read request.

18. The system of claim 16, wherein the first controller is configured so that the reference label sent with the mirror data is associated with a write request that the first controller has received but not yet processed prior to sending the mirror data.

19. The system of claim 13, wherein the first controller is configured to generate the mirror read request.

20. The system of claim 13, wherein the second controller is configured to transmit the mirror read request to the first controller.

21. The system of claim 13, wherein the first and second controllers are configured to process the write requests in an order in which the write requests are received.

22. The system of claim 13, wherein the first and second controllers are configured to process the write requests in an order corresponding to the associated reference labels.

23. The system of claim 22, wherein the reference labels comprise numbers and the first and second controllers are configured to process the write requests in order of numerical values of the associated reference labels.

24. A method of performing a mirror set copy from a first storage device to a second storage device in a computer system having a processor, the method comprising:
sending write requests from the processor to the first storage device and the second storage device,
processing the write requests at the first storage device,
sending a mirror read request to the first storage device,
reading mirror data from the first storage device in response to the mirror read request,
sending the mirror data to the second storage device along with a reference label that identifies one of the write requests,
writing the mirror data to the second storage device, and
selectively processing the write requests at the second storage device depending upon the reference label.

* * * * *